Patented Mar. 9, 1954

2,671,794

UNITED STATES PATENT OFFICE

2,671,794

PROCEDURE FOR THE PREPARATION OF $\Delta^{16}$-20-KETO-PREGNENES

Percy L. Julian, Maywood, and William J. Karpel, Chicago, Ill., assignors to The Glidden Company, Cleveland, Ohio, a corporation of Ohio No Drawing. Application March 29, 1950, Serial No. 152,752

16 Claims. (Cl. 260—397.4)

The $\Delta^{16}$-20-keto-pregnenes have been found to be very useful starting materials for the preparation of 17α-hydroxy-20-keto-pregnenes and pregnanes. Many of the important adrenal cortical hormones belong to the class of 17α-hydroxy-pregnenes. It is therefore of importance to devise methods for producing these $\Delta^{16}$-20-keto-pregnenes, with which objective the present invention is concerned.

It is therefore an object of the present invention to devise a novel method for the preparation of $\Delta^{16}$-20-keto-pregnenes.

A further object of the invention is to provide valuable intermediates for the synthesis of the adrenal cortical hormones.

Other objects will be evident to those skilled in the art from the following description.

In our co-pending application Serial No. 116,415, filed September 17, 1949, we showed that 17-bromo-21-bromo-20-keto-pregnenes and pregnanes were converted rather cleanly to 17-bromo-21-iodo-20-keto-pregnenes and pregnanes on treatment with sodium iodide in ethanol-benzene at room temperature. Inhoffen who had previously carried out a similar reaction had refluxed his 17,21 - dibromo - 20-keto-pregnane with sodium iodide in ethanol-benzene. We found that the purity of the resulting 17-bromo-20-iodo compound had been seriously impaired by this high temperature reaction with sodium iodide. Thus, in order to secure the pure 21-iodo-17-bromo-20-keto-pregnene, we were compelled to subject the mixture secured by Inhoffen to repeated fractional crystallization. We were therefore led to believe that in the presence of sodium iodide at elevated temperatures, further reactions took place, and subsequent experiments have shown that on extended treatment of 17-bromo-21-iodo-20-keto-pregnanes with sodium iodide at elevated temperatures, some 17-iodo-21-iodo-20-keto products can be isolated.

This discovery led us to investigate the action of sodium iodide on 20-keto-pregnenes bearing halogens at the 17- and 21-positions, under a variety of conditions.

It has been found that the 17,21,21-tribromo-20-keto-pregnenes and pregnanes described in co-pending application Serial No. 116,415, on treatment with sodium iodide in a glacial acetic acid solution, at elevated temperatures, are converted into the corresponding $\Delta^{16}$-20-keto-pregnenes. The reaction takes place rather smoothly at the boiling temperature of the glacial acetic acid solution, whereupon considerable iodine is liberated and the smooth reduction of the dibromo-methyl group at position 21 to a methyl group takes place. Simultaneously, a hydrogen atom and a halogen atom at positions 16 and 17, respectively, are removed, thus giving rise to $\Delta^{16}$-20-keto-pregnenes. It is difficult to conceive of this reaction as a mere elimination of hydrogen bromide or hydrogen iodide, inasmuch as no commonly accepted dehydrodehalogenating agent is present in the reaction mixture.

A possible mechanism for the reaction would involve replacement of the 17-bromo group by iodine and the formation of a free radical at position 17 with concurrent disassociation of atomic iodine. The instability of such a free radical involving carbon atom 17 could induce disproportionation, whereupon one molecule of the free radical would reduce another molecule of the same free radical. Such a mechanism, in other words, would involve the release of a proton from the free radical to another molecule of the same free radical, giving rise to a mixture of $\Delta^{16}$-20-keto-pregnene and the corresponding 16,17 saturated compound. This is merely one of the possible mechanisms for such a reaction and is not proposed as the only mechanism for the reaction in question, nor do we limit ourselves to this conception of the reaction. Thus, for example, the highly reactive atomic iodine, resulting from a disassociation of a 17-iodo compound, might itself act as a proton accepter and thus dehydrogenate the free radical to a $\Delta^{16}$-20-keto-pregnene.

We have found that this reaction of 17,21,21-tribromo-20-keto steroids with sodium iodide or other metallic iodide in glacial acetic acid is of general application regardless of substituents in the steroid nucleus or of double bonds in said nucleus.

It is obvious from the foregoing description that the treatment of 17,21,21-tribromo-20-keto-pregnenes and pregnanes with sodium iodide in glacial acetic acid might lead to some extent, depending upon the conditions, to complete reduction to the corresponding 16,17 saturated compound and that these in certain instances might contaminate the desired $\Delta^{16}$-20-keto-pregnenes. In most instances this is not a serious deterrent to the isolation of the pure $\Delta^{16}$-compound because of the fact that the $\Delta^{16}$-20-keto-pregnenes usually melt higher, and are more insoluble than the corresponding compounds saturated at the 16,17 positions. Accordingly, careful fractional crystallization can be employed for identification and separation, when desired.

The following examples will illustrate the invention.

EXAMPLE I

The preparation of 3α,12α-diacetoxy-17,21,21-tribromo-20-ketopregnane.—A solution of 2.9 g. of 3α,12α-diacetoxy-20-ketopregnane in 29 cc. of glacial acetic acid containing 2 drops of 32% hydrobromic acid in acetic acid was treated at room temperature with a solution of 3.4 g. of bromine in 7 cc. of glacial acetic acid. After one-half hour, all of the bromine had been absorbed. The mixture was poured into 250 cc. of water with stirring and the crystalline reaction product was separated by filtration and then washed with water. The product was dissolved in ether, washed with 5% sodium bicarbonate solution and then with water to neutrality. The solution was dried over sodium sulfate and concentrated in vacuo to a solid residue. This was then dissolved in 13 cc. of ether and 25 cc. of petroleum ether added to induce crystallization. There was obtained 2.6 g., melting point 162–164°. Crystallization from ether-petroleum ether raised the melting point to 164–165°.

Analysis.—Calc. for $C_{25}H_{35}O_5Br_3$: Br=36.6%. Found 36.4%.

EXAMPLE II

The preparation of 3α,12α-diacetoxy-20-keto-16-pregnene.—A solution of 2.0 g. of sodium iodide in 15 cc. of glacial acetic acid was added to a solution of 0.8 g. of 3α,12α-diacetoxy-17,21,21-tribromo-20-keto-pregnane in 10 cc. of glacial acetic acid. The solution was refluxed for seventy-five minutes, then cooled and diluted with water and extracted with ether. The ether solution was washed with a 5% solution of sodium thiosulfate to remove free iodine, then with a 5% solution of sodium bicarbonate to remove acetic acid and finally with water to neutrality. The ether solution was dried and concentrated to 3 cc. volume and 1 cc. of petroleum ether was added, whereupon crystallization rapidly took place. There was obtained 275 mg. of material, melting point 183–187°. From the mother liquor an additional 80 mg. of slightly impure material was obtained. This represents a 70% yield of the 3α,12α-diacetoxy-20-keto-16-pregnene.

EXAMPLE III

The preparation of 3β-acetoxy-20-keto-16-allopregnene.—A solution of 0.8 g. of 3β-acetoxy-17,21,21-tribromo-20-keto-allopregnane in 10 cc. of glacial acetic acid, described in co-pending application Serial No. 116,415, was treated with a solution of 2.2 g. of sodium iodide in 15 cc. of glacial acetic acid and refluxed for seventy-five minutes. The reaction mixture was worked up as in Example II. A sample of the total crystalline solid obtained, when analyzed on the Beckmann spectrophotometer on the basis of ultraviolet absorption at 238–239 mμ, indicated the presence of 45% of the 16-dehydroallopregnanolone acetate. This material was separated from allopregnanolone acetate, which was present as a by-product, by fractional crystallization. The allopregnanolone acetate recovered was recycled for reuse in the process.

EXAMPLE IV

The preparation of 3β-acetoxy-20-keto-5,16-pregnadiene.—A solution of 1.2 g. of 3β-acetoxy-17,21,21-tribromo-20-keto-5-pregnene in 15 cc. of glacial acetic acid, described in co-pending application Serial No. 116,415, was mixed with a solution of 3.3 g. of sodium iodide in 22 cc. of glacial acetic acid and refluxed for seventy-five minutes. The reaction mixture was worked up as in Example II. A sample of the total crystalline solid obtained indicated by ultraviolet absorption spectra the presence of 45% of 3β-acetoxy-20-keto-5,16-pregnadiene. This material was separated from pregnenolone acetate, which was present as a by-product, by fractional crystallization from a suitable solvent such as acetone.

EXAMPLE V

The preparation of 3α-acetoxy-11,20-diketo-12,17,21,21-tetrabromo-pregnane.—The 3α-acetoxy-11,20-diketo-12,21-dibromo-pregnane which served as the starting material was prepared by the ozonization of 3α-acetoxy-12,21-dibromo-11-keto - 24,24 - diphenyl - $\Delta^{20-22,-23-24}$ - choladiene which may be prepared by the method of Wettstein and Meystre, Helv. Chem. Acta 30, 1262 (1947) on the $\Delta^{23-24}$ diphenyl ethylene prepared from the 11-keto-12-bromo-3,9-oxido-cholanic acid methyl ester produced according to the procedure of McKensie, Mattox, Engel and Kendall, J. Biol. Chem., 173, 271 (1948). A solution of 1.0 g. of 3α-acetoxy-11,20-diketo-12,21-dibromo-pregnane in 8 cc. of glacial acetic acid and 8 cc. of carbon tetrachloride containing 0.5 cc. of 32% hydrobromic acid in acetic acid was treated with a solution of 0.9 g. of bromine in 3 cc. of acetic acid. After 2 hours at 30° C., the temperature was raised to 40° and the mixture held thusly for 10 hours, whereupon a crystalline tetrabromide separated. The carbon tetrachloride was removed in vacuo and the tetrabromide was removed by filtration. There was obtained 0.7 g., melting point 220–223° dec. The material remaining in the mother liquor, when dehalogenated with sodium iodide in glacial acetic acid, yielded as recovered material, 3-acetoxy-11,20-diketo-12-bromo-pregnane.

EXAMPLE VI

The preparation of 3α-acetoxy-11,20-diketo-12-bromo-16-pregnene.—A solution of 1.2 g. of sodium iodide in 10 cc. of glacial acetic acid was added to a solution of 0.6 g. of 3α-acetoxy-11,20-diketo-12,17,21,21-tetrabromo-pregnane in 7 cc. of acetic acid. The solution was refluxed for seventy-five minutes, then cooled and diluted with water and extracted with ether. The ether solution was washed with a 5% solution of sodium thiosulfate to remove free iodine, then with a 5% solution of sodium bicarbonate and finally with water to neutrality. The ether solution was dried and concentrated to 3 cc. volume, crystallized and chilled. There was obtained 150 mg., melting point 202° dec.

EXAMPLE VII

The preparation of 3α-acetoxy-11,20-diketo-16-pregnene.—3α-acetoxy - 11,20-diketo-21-bromo-pregnane prepared by the ozonization of 3α-acetoxy-11-keto-21-bromo-$\Delta^{20-22,23-24}$-choladiene is brominated as in Example V. The 3α-acetoxy-11,20-diketo-17,21,21-tribromo-pregnane is then heated with sodium iodide and glacial acetic acid as in Example VI. Upon working up the reaction mixture there is obtained 3α-acetoxy-11,20-diketo-16-pregnene. Upon working up the reaction mixture there is obtained 3α-acetoxy-11,20-diketo-16-pregnene, M. P. 163–165°. Recrystallization from acetone-petroleum ether affords needles, M. P. 169°. Analysis calcd. for $C_{23}H_{32}O_4$: C, 74.16; H, 8.66. Found: C, 73.86; H, 8.38.

EXAMPLE VIII

*The preparation of 3α-hydroxy-11,20-diketo-16-pregnene.*—A solution of 3α-acetoxy-11,20-diketo-16-pregnene in 40 cc. of methanol containing 0.5 g. of potassium bicarbonate in 7.5 cc. of water was refluxed for one hour. The solution, upon cautious dilution with water, deposited plates amounting to 0.35 g., M. P. 230–232°.

It is to be understood that many variations may be employed in carrying out the present invention. Thus, the free hydroxy compounds may be employed. However, bromination in acetic acid is a convenient bromination procedure and as this procedure provides a good acetylation mixture, it is convenient in most cases to start with the acetoxy compounds rather than the hydroxy compounds. Also, 3-keto compounds may be employed in the present invention to produce the 16-dehydro-derivatives. These are preferably to be avoided, however, since bromination may occur at the 2- and/or 4-positions when a 3-keto group is present during the bromination, especially in the case of saturated compounds. The 3-keto group may, however, be formed after bromination and prior to the debromination and dehydrobromination, but the preferred procedure where a 3-keto group is desired is to form this group subsequent to the treatment with sodium iodide and acetic acid.

Also other esters than the acetate, such as the propionate, butyrate, benzoate, etc. may be employed in the process to produce the corresponding 16-dehydro-derivatives. The same esters can also be prepared by esterification of the 16-dehydro-alcohols.

It is not essential that the reaction be carried out at the reflux temperature of the glacial acetic acid solution. Elevated temperatures are necessary, however, and the higher the temperature the more rapid the reaction. Since refluxing gives controllable and reproducible conditions, it is to be preferred.

It is also to be understood that sodium iodide may be replaced by other metal iodides which will provide iodine ions, such as potassium iodide, lithium iodide, etc.

Having described the invention, what is claimed is:

1. The process which comprises heating a cyclopentano-10,13-dimethyl-17,21,21-tribromo-20-keto-polyhydrophenanthrene with an alkali-metal iodide in a solvent comprising glacial acetic acid to bring about replacement of the two bromine atoms attached to the 21-carbon atom with hydrogen and to cause formation of a 16–17 double bond in the polyhydrophenanthrene nucleus.

2. The process which comprises heating a solution of an alkali-metal iodide and a cyclopentano-10,13-dimethyl-17,21,21-tribromo-20-keto-polyhydrophenanthrene in a solvent comprising glacial acetic acid at reflux temperature.

3. The process which comprises heating a glacial acetic acid solution of a cyclopentano-10,13-dimethyl-17,21,21-tribromo-20-keto-polyhydrophenanthrene and sodium iodide at reflux temperature.

4. The process which comprises heating a steroid selected from the class consisting of 17,21,21-tribromo-20-keto-5-pregnenes, 17,21,21-tribromo-20-keto-pregnanes and 17,21,21-tribromo-20-keto-allopregnanes with an alkali-metal iodide in a solvent comprising glacial acetic acid.

5. The process which comprises heating a glacial acetic acid solution of sodium iodide and a steroid selected from the class consisting of 17,21,21-tribromo-20-keto-5-pregnenes, 17,21,21-tribromo-20-keto-pregnanes and 17,21,21-tribromo-20-keto-allopregnanes at the refluxing temperature.

6. The process of claim 5 in which the steroid is a pregnene.

7. The process of claim 6 in which the pregnene is 3β-acetoxy-17,21,21-tribromo-20-keto-5-pregnene.

8. The process of claim 5 in which the steroid is an allopregnane.

9. The process of claim 8 in which the allopregnane is 3β-acetoxy-17,21,21-tribromo-20-keto-allopregnane.

10. The process which comprises heating a glacial acetic acid solution of sodium iodide and a 17,21,21-tribromo-20-keto-pregnane at the reflux temperature.

11. The process of claim 10 in which the pregnane is 3α,12α-diacetoxy-17,21,21-tribromo-20-keto-pregnane.

12. The process of claim 10 in which the pregnane is 3α-acetoxy-11,20-diketo-12,17,21,21-tetrabromo-pregnane.

13. The process of claim 10 in which the pregnane is 3α-acetoxy-11,20-diketo-17,21,21-tribromo-pregnane.

14. 3α-acetoxy-11,20-diketo-12-bromo-16-pregnene.

15. 3α-hydroxy-11,20-diketo-16-pregnene.

16. 3α-acetoxy-11,20-diketo-16-pregnene.

PERCY L. JULIAN.
WILLIAM J. KARPEL.

References Cited in the file of this patent

UNITED STATES PATENTS

| Number | Name | Date |
|---|---|---|
| 2,343,311 | Marker | Mar. 7, 1944 |
| 2,408,830 | Wagner | Oct. 8, 1946 |